(12) United States Patent
Fell

(10) Patent No.: US 9,310,201 B2
(45) Date of Patent: Apr. 12, 2016

(54) SENSOR

(75) Inventor: Christopher Paul Fell, Plymouth (GB)

(73) Assignee: ATLANTIC INERTIAL SYSTEMS LIMITED (GB)

( * ) Notice: Subject to any disclaimer, the term of this patent is extended or adjusted under 35 U.S.C. 154(b) by 134 days.

(21) Appl. No.: 13/823,934

(22) PCT Filed: Sep. 5, 2011

(86) PCT No.: PCT/GB2011/001297
§ 371 (c)(1),
(2), (4) Date: Mar. 15, 2013

(87) PCT Pub. No.: WO2012/035288
PCT Pub. Date: Mar. 22, 2012

(65) Prior Publication Data
US 2013/0192368 A1    Aug. 1, 2013

(30) Foreign Application Priority Data
Sep. 17, 2010   (GB) .................................. 1015585.1

(51) Int. Cl.
*G01C 19/56*   (2012.01)
*G01C 19/5684*   (2012.01)
*G01C 19/5719*   (2012.01)

(52) U.S. Cl.
CPC ........ *G01C 19/5684* (2013.01); *G01C 19/5719* (2013.01); *Y10T 29/49002* (2015.01)

(58) Field of Classification Search
CPC .......... G01C 19/5684; G01C 19/5677; G01C 19/5719; G01C 19/5712; G01C 19/56

USPC ............................ 73/504.13, 504.12, 504.04
See application file for complete search history.

(56) References Cited

U.S. PATENT DOCUMENTS

| | | | |
|---|---|---|---|
| 5,932,804 A | 8/1999 | Hopkin et al. | |
| 6,282,958 B1 * | 9/2001 | Fell et al. | 73/504.13 |
| 7,040,163 B2 * | 5/2006 | Shcheglov et al. | 73/504.13 |
| 7,861,589 B2 * | 1/2011 | Lee et al. | 73/504.13 |
| 8,011,246 B2 * | 9/2011 | Stewart | 73/504.13 |
| 8,205,495 B2 * | 6/2012 | Challoner | 73/504.13 |
| 8,327,526 B2 * | 12/2012 | Ge et al. | 29/611 |
| 8,393,212 B2 * | 3/2013 | Ge et al. | 73/504.13 |
| 8,408,060 B2 * | 4/2013 | Kuang et al. | 73/504.13 |
| 2007/0119258 A1 * | 5/2007 | Yee | 73/649 |
| 2009/0095077 A1 * | 4/2009 | DeNatale et al. | 73/504.13 |
| 2010/0270632 A1 * | 10/2010 | Ge | 257/417 |

FOREIGN PATENT DOCUMENTS

| | | |
|---|---|---|
| GB | 2 292 609 | 2/1996 |
| WO | 2004015372 A1 | 2/2004 |
| WO | 2006124303 A1 | 11/2006 |
| WO | 2007005132 A1 | 1/2007 |

OTHER PUBLICATIONS

International Search Report dated Jan. 17, 2012.

* cited by examiner

*Primary Examiner* — Helen Kwok
(74) *Attorney, Agent, or Firm* — Cantor Colburn LLP

(57) ABSTRACT

A silicon MEMS gyroscope is described having a ring or hoop-shaped resonator. The resonator is formed by a Deep Reactive Ion Fitch technique and is formed with slots extending around the circumference of the resonator on either side of the neutral axis of the resonator. The slots improve the Quality Factor Q of the gyroscope without affecting the resonant frequency of the resonator.

10 Claims, 7 Drawing Sheets

SENSOR

CROSS REFERENCE TO RELATED APPLICATION

The present application is the U.S. national stage application of International Application PCT/GB2011/001297, filed Sep. 5, 2011, which international application was published on Mar. 22, 2012, as International Publication WO2012/035288. The International Application claims priority of British Patent Application No. 1015585.1, filed Sep. 17, 2010, the contents of which are incorporated herein by reference in their entireties.

TECHNICAL FIELD

The invention relates to sensors. More specifically but not exclusively it relates to sensors such as inertial sensors, for example coriolis gyroscopes, where a linear velocity component is first established and the rate dependant coriolis force is a function of this velocity.

BACKGROUND

Planar silicon ring structures are commonly used in Micro-Electro-Mechanical-Systems (MEMS) gyroscopes. Examples of such devices are described in U.S. Pat. No. 5,932,804 and U.S. Pat. No. 6,282,958. Gyroscope devices utilising these resonator designs are used in a range of automotive and commercial applications. The performance of these devices may also be suitable for use in some guidance and control applications for example, for guided projectiles where the flight time is relatively short (tens to hundreds of seconds). For applications where longer operating times are required, the performance of these devices may not be sufficiently accurate with the magnitude of the bias drift error being particularly problematic.

One of the primary factors limiting the bias drift performance is the Quality Factor (Q) of the resonator structure. A high Q is beneficial in reducing the drive voltage that must be applied to set the primary mode into resonance. Cross-coupling of this drive signal into the rate sensing channel is one of the main error drivers for the bias stability where the coupled signal is indistinguishable from that produced by an applied rotation rate. Other bias errors associated with transducer misalignment and damping non-uniformity may also be significantly reduced by increasing the Q value of the resonator.

In MEMS devices the Q is determined by a number of contributory damping factors. The effective Quality Factor, $Q_{Eff}$, will be determined by the sum of all of these damping contributions and may be expressed as:

$$\frac{1}{Q_{Eff}} = \frac{1}{Q_{TE}} + \frac{1}{Q_{Gas}} + \frac{1}{Q_{Other}} \quad (1)$$

where $Q_{TE}$ is the thermoelastic damping contribution, $Q_{Gas}$ the gas damping contribution and $Q_{Other}$ includes contributions from support losses, intrinsic material losses and electronics damping.

Gyroscopic devices based on the resonator design of U.S. Pat. No. 5,932,804 use a ring structure which has an outer diameter of 6 mm and a rim thickness of 120 microns. This structure is operated in a partial vacuum with a 10 Torr residual pressure of dry Nitrogen (room temperature value). The $Q_{Eff}$ value for this device has been shown to be 5000 and has been shown to result from approximately equal contributions from the thermoelastic and gas damping with the $Q_{other}$ contribution being significantly lower. Therefore, even under high vacuum the $Q_{Eff}$ value will be limited to 10,000 by the thermoelastic damping.

The mechanism of thermoelastic damping in MEMS resonators is well known to those skilled in the art and will only be described in summary here to aid the understanding of the invention. As the resonator oscillates in the cos 2θ flexural mode, the ring will be subject to cyclic compressive and tensile stresses around the vibration anti-nodes at the inner and outer vertical surfaces. Where the ring is compressed there will be a slight increase in temperature and, where the ring is in tension, there will be a slight reduction in temperature, setting up a temperature gradient across the ring. This temperature gradient will alternate as the ring oscillates. There will thus be a time dependent heat flow across the ring. Relaxation occurs as the heat flows from the hotter compressed region to the cooler extended region of the ring with an associated time constant, τ. The relaxation time depends on the length of the temperature gradient (in this case the ring width, $r_t$) and the thermal diffusivity of the material, $\chi$, as described in the following equation:

$$\tau_r = \frac{r_t^2}{\pi^2 \chi} \quad (2)$$

The intrinsic damping is a function of the relaxation time, the frequency at which the structure vibrates and a number of material properties. The loss factor is given by:

$$\eta_r = \frac{E\alpha^2 T}{C_V} \frac{\omega_n \tau_r}{1 + \omega_n^2 \tau_r^2} \quad (3)$$

where E, α, and $C_V$ are the Young's modulus, thermal expansion coefficient and heat capacity per unit volume of the material, in this case silicon, $\omega_n$ is the oscillation frequency and T is the ambient temperature respectively. The $Q_{TE}$ factor is given by:

$$Q_{TE} = \frac{1}{\eta_r} \quad (4)$$

Examination of equations 3 and 4 shows that the $Q_{TE}$ factor will be a minimum when the operating frequency coincides with the peak loss frequency, $\omega_{max}$ which is given by:

$$\omega_{max} = \frac{1}{\tau_r} = \frac{\pi^2 \chi}{r_t^2} \quad (5)$$

The variation of the loss factor with frequency for a 6 mm silicon ring structure, as used in products based on the design of U.S. Pat. No. 5,932,804, is shown in FIG. 1. It can be seen that the peak loss occurs at around 10 kHz. The cos 2θ operating frequency for this device is at 14 kHz and is therefore nearly coincident with the peak loss frequency. This means that the thermoelastic damping is approaching a maximum value and the calculated $Q_{TE}$ value is very close to the experimental observed value of ~10,000.

Some improvement in the $Q_{Eff}$ for this device can be achieved by packaging the resonator at a reduced pressure however the increase is fundamentally limited by the thermoelastic damping. Significantly enhancing the $Q_{Eff}$ for this device can only be achieved if the $Q_{TE}$ contribution can be reduced. Conventionally, reduction of this term requires the rim thickness, $r_t$, to be changed, thus changing the loss frequency. This will however result in a shift in the resonant frequency which would necessitate undesirable changes to the control electronics. The $Q_{TE}$ can be effectively increased without shifting the cos 2θ resonance frequency by reducing the ring diameter and the rim thickness in appropriate proportions. However, while this does enable $Q_{TE}$, to be increased, the smaller geometry will have a detrimental effect on other aspects of the device performance. In particular, the signal to noise ratio will be reduced due to the reduction in the size of the sensing transducers. Also, the mechanical tolerances of the fabrication process will become more critical which can adversely affect the production yield. Further changes would be required to the magnetic circuit components which would also result in adverse changes to both scalefactor and bias performance characteristics.

The above discussion relates particularly to the 6 mm ring implementation of the design described in U.S. Pat. No. 5,932,804. However, it will be appreciated that similar considerations apply to devices which are being produced based on the design described in U.S. Pat. No. 6,282,958. Practical devices utilising 4 mm and 8 mm diameter rings have been produced. The $Q_{Eff}$ for these designs has been shown to be similarly limited by the thermoelastic damping to varying degrees.

It would therefore be beneficial to be able to have the capability to adjust the peak loss frequency independently of the ring diameter and rim thickness in order to increase the $Q_{TE}$ for typical ring structures. This would enable improvements to be made to the critical bias drift error without adversely affecting other performance parameters or the production yield and without necessitating any changes in the control electronics.

SUMMARY

According to the invention there is provided a sensor having a high Quality Factor (Q) comprising a vibrating structure comprising a substantially planar ring or hoop shaped vibratory resonator, the resonator having inner and outer peripheries extending around a neutral axis, drive means for causing the resonator to vibrate, a plurality of support means for supporting the resonator and for allowing the resonator to vibrate in response to the drive means in a substantially undamped oscillation mode such as to permit the resonator to move relative to the support means in response to turning rate of the sensor, in which the resonator includes a first series of radially positioned slots inwardly of the neutral axis and a second series of radially positioned slots outwardly of the neutral axis of the resonator said series of slots being concentrically positioned relative to the neutral axis of the resonator such that the positioning of the slots adjusts the thermal relaxation path lengths on the resonator without affecting the resonant frequency of the resonator thereby increasing the Q factor of the resonator.

According to a further aspect of the invention, there is provided a method of improving the Quality Factor Q of a sensor having a planar ring or hoop-shaped resonator comprising the step of forming slots in the resonator, said slots being positioned concentrically, externally and internally to the neutral axis of the resonator such that said slots do not affect the resonant frequency of the resonator.

The peak loss frequency for a silicon resonator beam structure, as defined by equation 5, is strongly dependent upon the radial thickness, $r_t$, which defines the relaxation path length for the heat flow as the beam resonates. In this way, the present invention defines a sensor and method for advantageously adjusting the relaxation path length on a planar silicon ring resonator, without requiring any changes to the ring diameter or resonant frequency.

BRIEF DESCRIPTION OF THE DRAWINGS

The invention will now be described with reference to the accompanying diagrammatic drawings in which.

DETAILED DESCRIPTION

Figure 8:
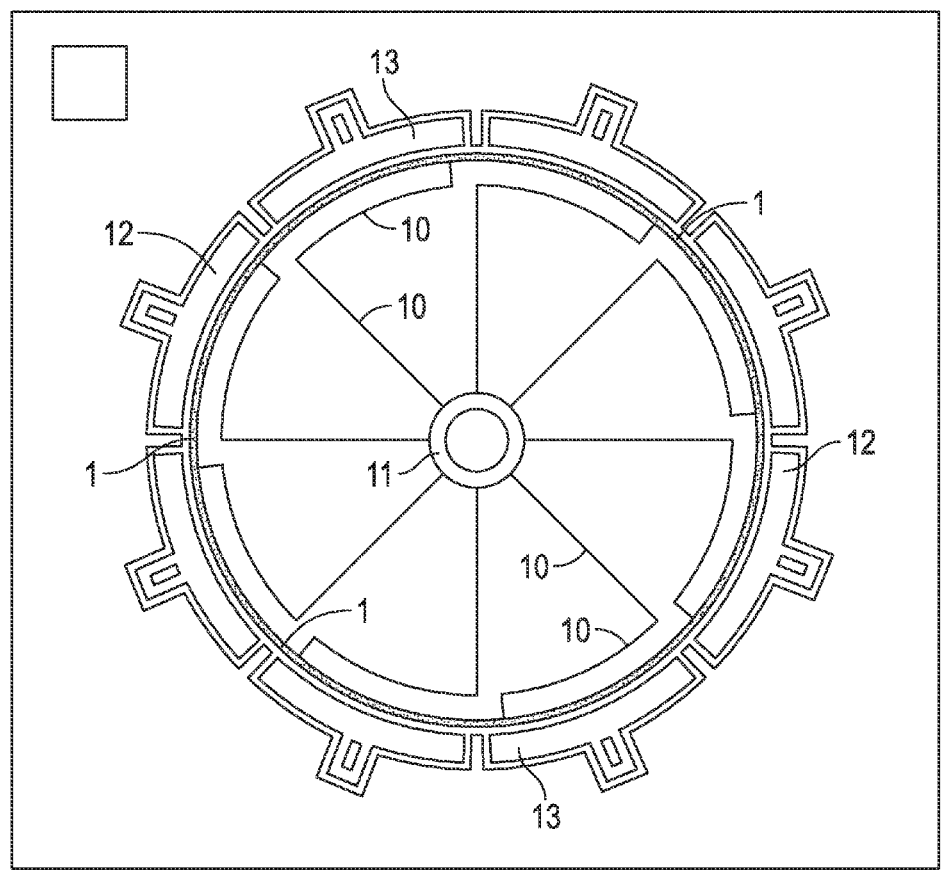
FIG. 8 illustrates an inertial sensor of the type to which the invention may be applied.

Referring firstly to FIG. 8, an inertial sensor (for example of the general type described in greater detail in U.S. Pat. No. 6,282,958) comprises a ring-like resonator 1 mounted by support beams 10 extending from the inner periphery of the ring-like resonator 1 to a boss 11. The support beams 10 are flexible and allow the resonator 1 to vibrate in response to electrostatic drives 12, 13 in a substantially undamped oscillation mode to permit the resonator 1 to move relative to the boss 11 in response to turning rate.

Figure 1:
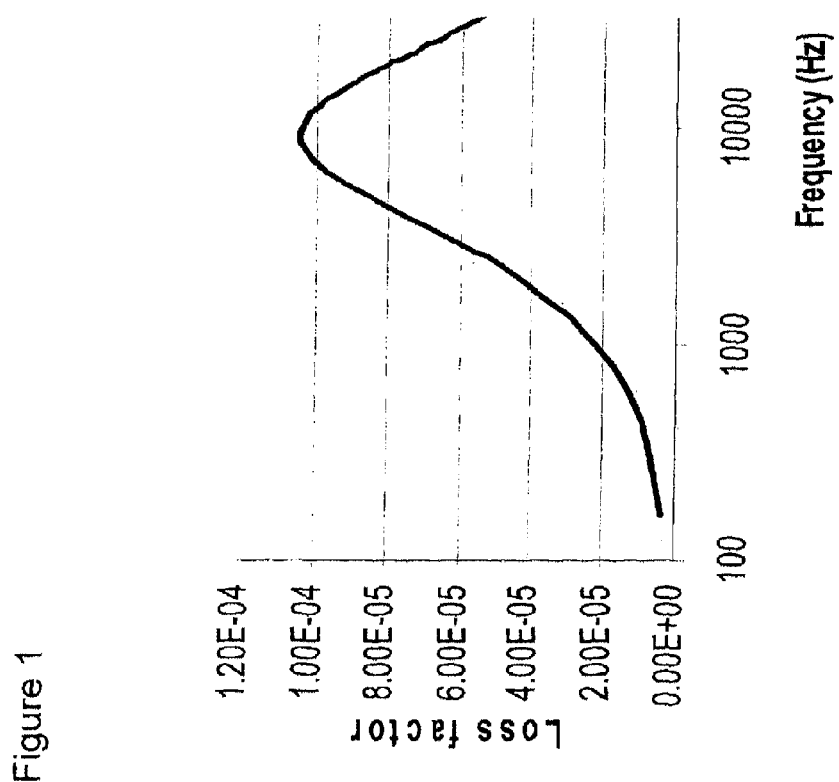
FIG. 1 shows a plot of the variation of the thermoelastic loss factor as a function of excitation frequency for a known resonator structure.
Figure 2:
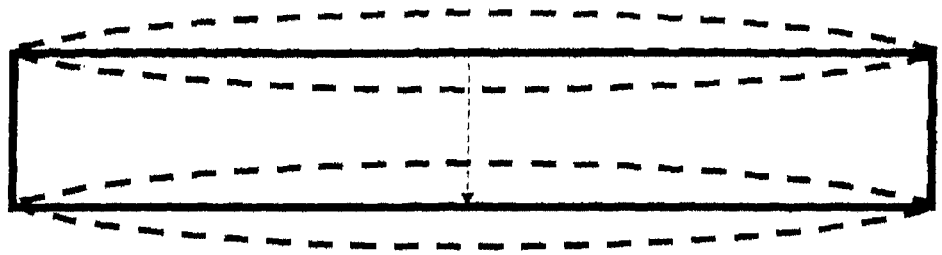
FIG. 2 shows a schematic representation of the fundamental vibration mode of a rectangular beam, fixed at both ends, where the extremes of vibration are shown by the dotted lines, showing the dominant thermal relaxation path at a modal anti-node (arrow)
Figure 3:
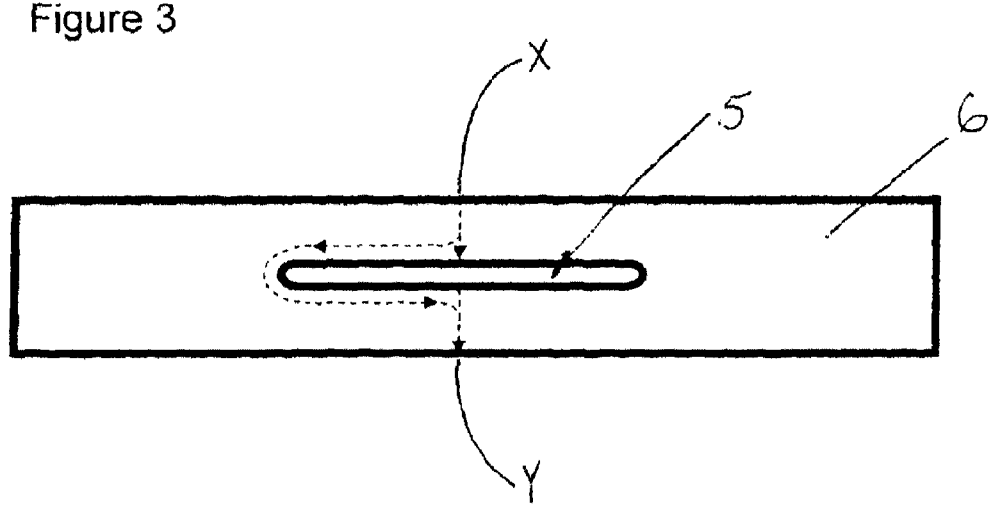
FIG. 3 shows a schematic representation of a similar rectangular beam to that in FIG. 2 incorporating a slot in accordance with one form of the invention, showing the modification to the thermal relaxation as represented by the arrows.

FIG. 2 shows an exemplary uniform oscillating beam, fixed at both ends vibrating in the fundamental mode (shown by dotted lines). The dominant thermal relaxation path for this structure is directly across the width of the beam as shown by the arrow in FIG. 2. It is possible to adjust this path length by incorporating a slot 5 into the beam structure, as shown in FIG. 3. The heat flow is therefore interrupted by the discontinuity in the silicon structure thus changing the characteristic relaxation path length. Simplistically, when considering the heat flow across the beam along a line between points X and Y there are now two new primary relaxation paths. One is, directly across the width of the thin beam section between the outer rim and the slot, with a second longer path from the rim, around the slot and across to the other side of the beam, as illustrated by the arrows in FIG. 3. For this longer path, a significant portion of the heat flow path is directed laterally along the beam structure. The peak loss frequencies for these paths will be substantially shifted from the simple beam path length. The characteristic peak loss frequency for the short relaxation path will be shifted to a significantly higher frequency and that for the longer relaxation path to a much lower frequency.

Figure 4:
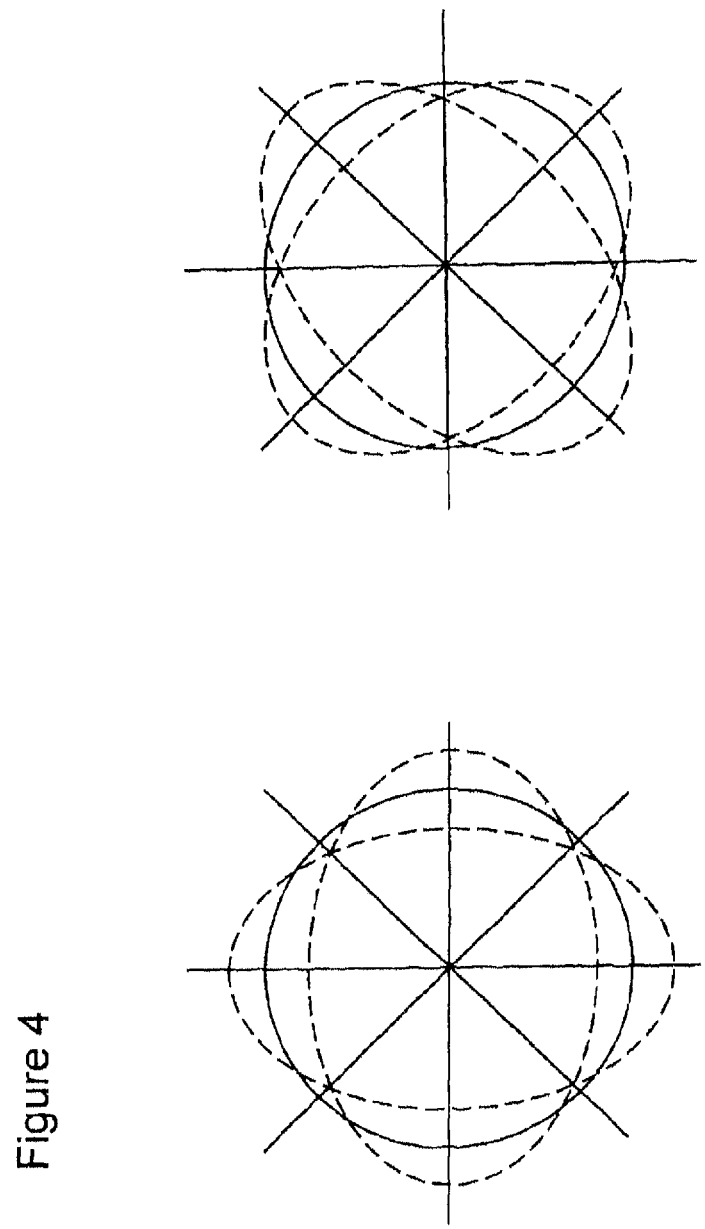
FIG. 4 shows a schematic representation of the cos 2θ vibration mode shapes which are typically employed on known Coriolis gyroscopes utilising ring resonator structures
Figure 5:
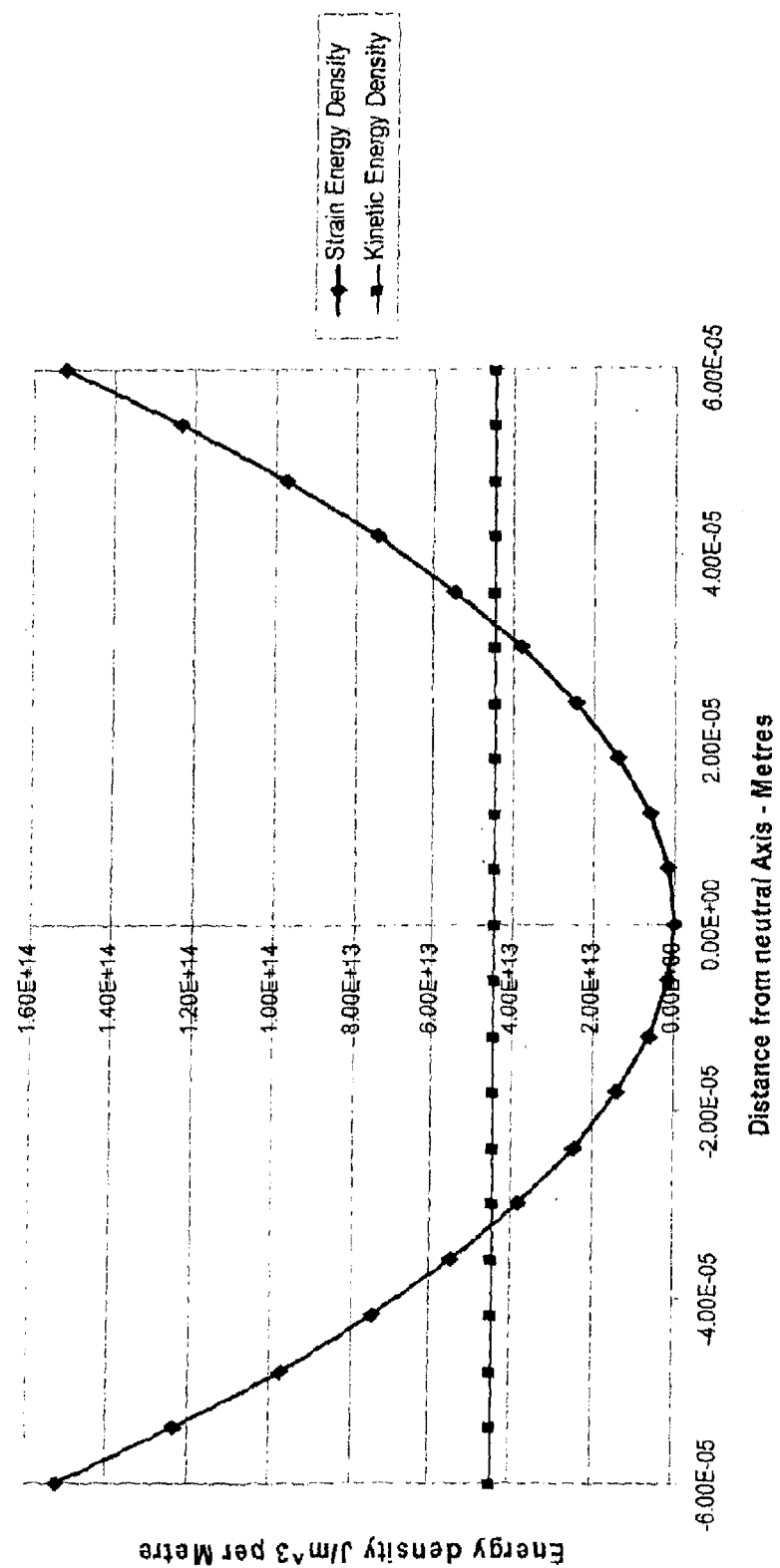
FIG. 5 shows the variation of the strain and kinetic energy densities across a section of the ring rim adjacent to the radial anti-node of the cos 2θ vibration mode for a known ring resonator structure.

Incorporating such slots 5 into ring structures, will locally adjust both the mass and stiffness of the ring. The cos 2θ vibration mode shapes typically used on such devices are shown schematically in FIG. 4. The radial variation of the strain energy density and kinetic energy density across a rim segment at the cos 2θ radial anti-node is shown in FIG. 5. If the slots 5 are located at the centre of the rim (i.e. on the neutral axis 4 of the ring 1) then they will predominantly affect the kinetic energy density while having very little effect of the strain energy density. This will give rise to an increase in the cos 2θ mode frequency. This frequency is given by:

$$f = n(n+1)\sqrt{\frac{k}{m}} \quad (6)$$

where n is the mode order (=2 for cos 2θ modes), m is the modal mass and k is the stiffness of the ring. Locating the slots on the neutral axis reduces m without significantly effecting k, thus increasing the resonant frequency. If the slots are located towards the outer edge of the rim the effect will be to reduce the strain energy density and thus the ring stiffness k. Towards the outer edge, this effect will be larger than the effect on the modal mass m. The net effect will be to reduce the ring frequency by an amount which is strongly dependent upon the exact radial location of the slot.

Silicon ring structures described above and in other known examples of MEMS gyroscopes may be formed using well known Deep Reactive Ion Etch (DRIE) techniques. This process is capable of forming high aspect ratio trenches of fine geometry which are used to fabricate the ring 1 and supporting leg structures 10. In accordance with the invention, slots 5 are provided in the ring 1 and may also conveniently be formed at the same time as the ring fabrication thus allowing them to be formed in precise alignment with respect to the ring rim using a single photo-mask. This process is capable of producing structures to a high degree of accuracy. However, there are associated process variations which affect the ring geometry to a variable degree thus giving rise to a variation in the resonant frequency of the fabricated resonator structures. The effect of these geometry variations (typically of the order of ±1 micron) on ring frequency will be increased by the addition of slots 5 close to the edge of the rim. Accurate control of the ring frequency is essential as the MEMS device is required to operate in conjunction with control electronics which will typically have a restricted operating frequency range.

In order to minimise the sensitivity of the resonator 1 frequency to these process variations, it is advantageous to select the radial location of the slots 5 such that the effect on ring stiffness is approximately equal the effect on the mass (i.e. Δk/k=Δm/m). The radial location of this region can be seen in FIG. 5 where the kinetic and strain energy densities are equal. This will help to ensure that the effect of small geometric variations arising during the fabrication process do not have a detrimental effect on the resonant frequencies.

There are a number of additional practical limitations which must be taken into consideration when designing the detailed slot configuration. The slots 5 will effectively result in the formation of a series of connected thinner ring segments 6. The length and thickness of these segments must be such that they are significantly stiffer than the stiffness of the ring when oscillating in the cos 2θ mode. This means that these segments essentially behave as though they are part of homogeneous structure when the ring 1 is vibrating in the cos 2θ mode. This effectively limits the arcuate angle of the segments to a practical limit of ≤5 degrees with a circumferential separation between adjacent slots of ≥2 degrees. The slots 5 must also be located such that the resultant effect on the primary and secondary cos 2θ mode shapes is equal to avoid induced any imbalance in the frequencies or damping. This is conveniently achieved by utilising slots 5 of a uniform design (i.e. same radial distance from neutral axis, angular extent and separation) which are equi-angularly positioned around the circumference. The number and location of the slots 5 must be such that the relaxation path is adjusted for the majority of the circumference of the ring rim in order to minimise the thermoelastic damping.

Figure 6:
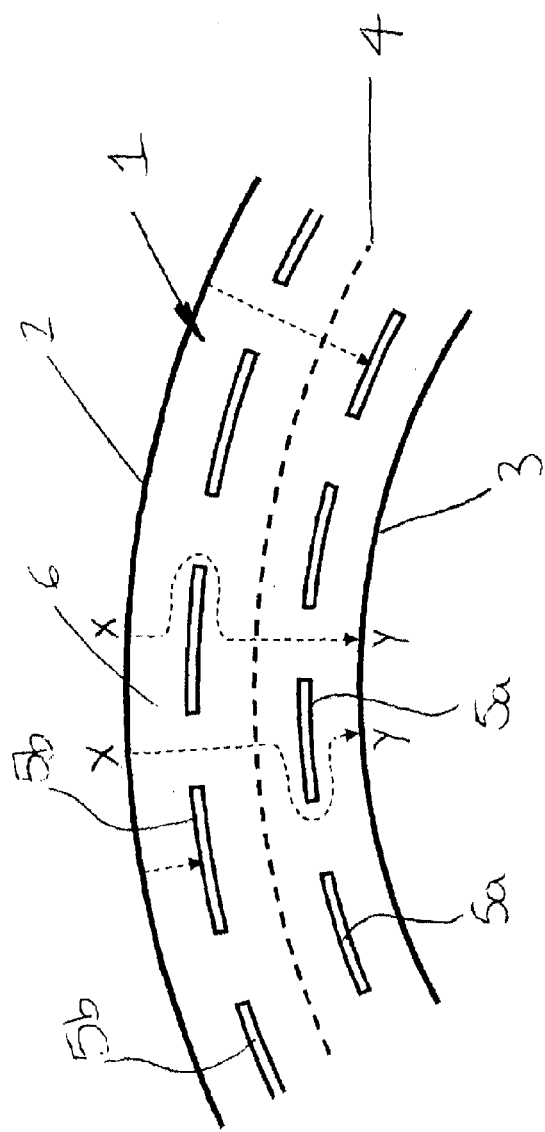
FIG. 6 is a schematic diagram of a section of a ring structure, according to one form of the present invention, incorporating two rows of slots either side of the neutral axis (illustrated by dotted line) with examples of representative thermal relaxation paths shown by the arrows.

FIG. 6 shows an embodiment of the invention utilising two rows of slots. One row of slots 5b is positioned with the centre of the slot at a distance externally to the neutral axis 4 that coincides with the point at which the strain and kinetic energy densities (as shown in FIG. 2) are equal. The second row of slots 5a is located at an identical distance internal to the neutral axis 4. The resonant frequency of such a ring 1 will therefore be identical to a ring 1 with no slots 5. The angular location of the two rows is such that the centre of each slot 5b of the external row coincides with the central position between the slots 5a of the internal row. This ensures that there is no direct thermal relaxation path across the ring 1. Examples of some relaxation paths are shown by the arrows in FIG. 6. In practice, accurate determination of the thermal relaxation characteristics of such a ring 1 require the use of finite element modelling techniques which are capable of providing an estimate of the thermoelastic damping and hence the $Q_{TE}$ value.

Sample resonators devices have been fabricated incorporating two rows of slots 5a, 5b as described above. The slots are 3 degrees angular span with a separation of 2 degrees giving a total of 144 slots around the complete circumference of the ring. The slots are 10 microns in width and positioned around the points at which the strain and kinetic energy densities are equal. These devices were measured to have a $Q_{Eff}$ of approximately 25,000 which is in good agreement with the modelled value of approximately 30,000. This represents a significant increase above the 10,000 value for the un-slotted ring of the prior art.

Figure 7:
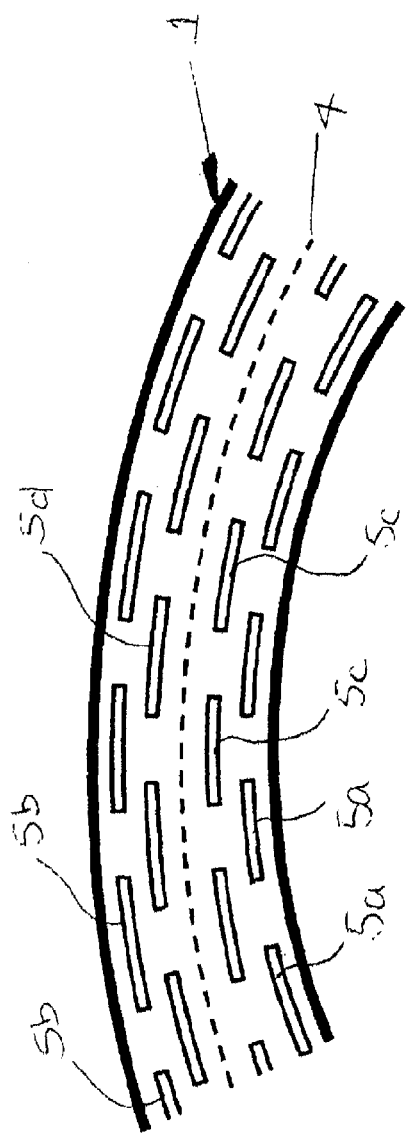
FIG. 7 shows a schematic diagram of a section of a ring structure, according to one form of the present invention, incorporating four rows of slots either side of the neutral axis (illustrated by dotted line)

FIG. 7 shows an alternative embodiment of the invention, incorporating four rows of slots 5a, 5b, 5c, 5d located symmetrically around the neutral axis 4. The outer rows of slots 5b, 5d will predominantly perturb the strain energy density (thus reducing the stiffness, k) and will therefore tend to reduce the resonant frequency. The inner rows of slots 5a, 5c will predominantly perturb the kinetic energy density (thus reducing the modal mass, m) and will therefore tend to increase the resonant frequency. The inner 5a, 5c and outer 5b, 5d slots may therefore be located such that their effect on the resonant frequency is substantially cancelled out. Incorporating four rows of slots 5a, 5b, 5c, 5d clearly provides additional scope for optimising the $Q_{TH}$ (i.e. short relaxation paths can be made shorter and long relaxation paths longer).

The two exemplary embodiments described above represent specific designs for increasing the $Q_{TE}$ on silicon ring structures. Those skilled in the art will appreciate that there is significant potential for design variations within the scope of the current invention. This includes variations to the number, angular extent and separation and the radial location of the slots. The requirement for matching the kinetic and strain energy density effects may also be relaxed to some extent by adjusting the rim width of the ring to account for perturbations in the resonant frequency.

It will further be appreciated that whilst the embodiments described above refer to resonators formed as silicon ring structures the resonators may be formed from any suitable materials. Furthermore, the resonator need not be formed from a single bulk material but may comprise layers of silicon or other suitable material on a bulk substrate.

The invention claimed is:

1. A sensor having a high Quality Factor (Q) comprising a vibrating structure comprising a substantially planar ring or hoop shaped vibratory resonator, the resonator having inner and outer peripheries extending around a neutral axis, drive means for causing the resonator to vibrate, a plurality of support means for supporting the resonator and for allowing the resonator to vibrate in response to the drive means in a substantially undamped oscillation mode so as to permit the resonator to move relative to the support means in response to turning rate of the sensor, in which the resonator includes a first series of radially positioned slots inwardly of the neutral axis and a second series of radially positioned slots outwardly of the neutral axis of the resonator said first and second series of slots being concentrically positioned relative to the neutral axis of the resonator such that the positioning of the first and second series slots adjusts the thermal relaxation path lengths on the resonator without affecting the resonant frequency of the resonator thereby increasing the Q factor of the resonator, the first and second series of slots being radially positioned on the resonator where the kinetic and strain energy densities are equal such that the effect on the resonator stiffness is approximately equal to the effect on the resonator mass.

2. A sensor according to claim 1 in which the resonator includes a further series of slots positioned inwardly and outwardly of the neutral axis of the resonator.

3. A sensor according to claim 1 in which the first an second series of slots result in the formation of a series of connected thinner ring segments, the length and thickness of the segments being such that the segments are stiffer than the stiffness of the resonator when oscillating in cos 2 θ mode, the segments substantially behaving as part of a homogeneous structure when the resonator is vibrating in the cos 2 θ mode.

4. A sensor according to claim 3 in which the arcuate angle of the segments is ≤5 degrees and the separation between adjacent slots in either series is ≥2 degrees.

5. A sensor according to claim 1 in which the first and second series of slots are of a uniform design such that the resultant effect on primary and secondary cos 2 θ mode shapes is equal to avoid any induced imbalance in the frequencies or damping of the resonator.

6. A sensor according to claim 5 in which the first and second series of slots are positioned the same radial distance from neutral axis, have the same angular extent and separation and are equi-angularly positioned around the circumference of the resonator.

7. A sensor according to claim 1 in which the position of the first series of slots inwardly of the neutral axis of the resonator is staggered in relation to the second series of slots outwardly of the neutral axis of the resonator such that a thermal relaxation path length is greater.

8. A method of improving the Quality Factor Q of a sensor having a planar ring or hoop-shaped resonator comprising the step of forming first and second series of slots in the resonator, said first and second series of slots being positioned concentrically, externally and internally to the neutral axis of the resonator such that said slots do not affect the resonant frequency of the resonator, the first and second series of slots being radially positioned on the resonator where the kinetic and strain energy densities are equal such that the effect on the resonator stiffness is approximately equal to the effect on the resonator mass.

9. A method according to claim 8 further comprising the step of forming the first and second series of slots in a uniform design such that the resultant effect on primary and secondary cos 2 θ mode shapes is equal to avoid any induced imbalance in the frequencies or damping of the resonator.

10. A method according to claim 8 further comprising the step of positioning the first and second series of slots the same radial distance from neutral axis, the slots having the same angular extent and separation and the slots being equi-angularly positioned around the circumference of the resonator.

* * * * *